(12) United States Patent
Hayashi et al.

(10) Patent No.: US 7,691,299 B2
(45) Date of Patent: Apr. 6, 2010

(54) PROCESS FOR PRODUCTION OF EXPANDED POLYTETRAFLUOROETYLENE PRODUCTS

(75) Inventors: Fumihiro Hayashi, Osaka (JP); Yasuhiro Okuda, Osaka (JP); Motomi Nakata, Osaka (JP); Koichiro Natori, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/513,150

(22) PCT Filed: May 1, 2003

(86) PCT No.: PCT/JP03/05588

§ 371 (c)(1),
(2), (4) Date: Nov. 2, 2004

(87) PCT Pub. No.: WO03/093356

PCT Pub. Date: Nov. 13, 2003

(65) Prior Publication Data

US 2005/0167875 A1 Aug. 4, 2005

(30) Foreign Application Priority Data

May 2, 2002 (JP) .............................. 2002-130608

(51) Int. Cl.
*B27J 5/00* (2006.01)
*D01D 5/24* (2006.01)
*A61F 2/06* (2006.01)

(52) U.S. Cl. .................... 264/127; 264/119; 264/209.3; 264/209.5; 264/209.8; 264/291; 425/131.1; 425/380; 425/467; 623/1.1; 623/1.39

(58) Field of Classification Search .......... 264/109–128
See application file for complete search history.

(56) References Cited

U.S. PATENT DOCUMENTS

| 2,364,566 | A | * | 12/1944 | Stupakoff et al. ....... | 425/192 R |
| 3,295,166 | A | * | 1/1967 | Owings ...................... | 118/125 |
| 3,878,164 | A | * | 4/1975 | Lott ........................... | 522/156 |
| 4,145,385 | A | * | 3/1979 | Sako et al. .................. | 264/469 |
| 4,482,516 | A | * | 11/1984 | Bowman et al. ............ | 264/127 |
| 4,529,564 | A | * | 7/1985 | Harlow ...................... | 264/127 |
| 4,743,480 | A | | 5/1988 | Campbell et al. | |
| 4,945,125 | A | * | 7/1990 | Dillon et al. ................ | 524/427 |
| 4,973,609 | A | * | 11/1990 | Browne ...................... | 521/81 |

(Continued)

FOREIGN PATENT DOCUMENTS

EP 0 230 635 12/1986

(Continued)

*Primary Examiner*—Jeffrey Wollschlager
(74) *Attorney, Agent, or Firm*—McDermott Will & Emery LLP

(57) ABSTRACT

Disclosed are expanded polytetrafluoroethylene products, such as porous polytetrafluoroethylene tubes, having high axial tear strength and a process for their production. Each expanded polytetrafluoroethylene product has a microstructure, which comprises fibrils and nodes interconnected with each other by the fibrils, and has an axial tear strength of not lower than 6,000 gf/mm as calculated in accordance with the following formula: $L/[T \times (V/100)]$ where $L$ (gf) is an axial tear load, $T$ (mm) is a wall thickness, and $V$ (%) is a volume ratio of resin. The process for the production of the expanded polytetrafluoroethylene product includes a high-speed extrusion step.

4 Claims, 2 Drawing Sheets

U.S. PATENT DOCUMENTS

| | | | |
|---|---|---|---|
| 5,861,033 A * | 1/1999 | Martakos et al. | 623/1.1 |
| 5,980,799 A * | 11/1999 | Martakos et al. | 264/127 |
| 6,627,277 B1 * | 9/2003 | Uchida et al. | 428/35.7 |
| 6,689,160 B1 * | 2/2004 | Okuda et al. | 623/1.39 |
| 6,747,108 B1 * | 6/2004 | Hosokawa et al. | 526/206 |

FOREIGN PATENT DOCUMENTS

| | | | |
|---|---|---|---|
| JP | 42-13560 | | 8/1967 |
| JP | 43-20384 | | 9/1968 |
| JP | 52-9074 | | 3/1977 |
| JP | 5-84292 | A | 4/1993 |
| JP | 7-15022 | | 2/1995 |
| JP | 11-240917 | A | 9/1999 |
| WO | WO99/10159 | * | 3/1999 |
| WO | WO00/02935 | * | 1/2000 |
| WO | WO00/72894 | * | 12/2000 |

* cited by examiner

US 7,691,299 B2

PROCESS FOR PRODUCTION OF EXPANDED POLYTETRAFLUOROETHYLENE PRODUCTS

TECHNICAL FIELD

This invention relates to expanded polytetrafluoroethylene products, and more specifically to expanded polytetrafluoroethylene products having high axial tear strength despite their high porosity, and also to a process for their production. The expanded polytetrafluoroethylene products according to the present invention are generally used as artificial blood vessels and sutures and for other applications in the form of tubes, filaments, rods or the like. Expanded polytetrafluoroethylene tubes according to the present invention are equipped with suitable properties especially as artificial blood vessel materials.

BACKGROUND ART

An expanded polytetrafluoroethylene (hereinafter abbreviated as "PTFE") product formed using PTFE has a microstructure comprising fibrils and nodes interconnected with each other by the fibrils. Expanded PTFE products are porous for such microstructures, and therefore, are also called "porous PTFE products"

Properties of an expanded PTFE product, such as pore size and porosity, can be controlled primarily by relying upon stretching conditions. Among such expanded PTFE products, expanded PTFE tubes which may hereinafter be called "porous PTFE tubes" are provided with properties derived from their porous nature, such as flexibility, fluid permeability, fine particulate capturing capacity, low dielectric constant and low dielectric dissipation factor, in addition to properties such as heat resistance and chemical resistance and surface properties such as low friction coefficient, water repellency and non-tackiness, all of which are possessed by the material PTFE itself. For these unique properties, the utility of expanded PTFE tubes is not limited only to the general industrial field but is also spreading to the medical field and the like.

Taking a porous PTFE tube, for example, it is rich in flexibility and its material PTFE itself is excellent in antithrombic property, and moreover, its porous structure based on a microfibrous structure formed as a result of the stretching and comprising a number of fibrils and a number of nodes interconnected with each other by the fibrils is excellent in biocompatibility. Expanded PTFE tubes, therefore, have found wide-spread utility as substitute blood vessels for maintaining circulation, for example, to replace lesion parts of blood vessels in living bodies, especially to bypass such lesion parts.

A porous PTFE tube is generally produced by mixing a liquid lubricant with unsintered powder of PTFE, forming the resulting mixture into a tubular shape by ram extrusion, drying off the liquid lubricant, and then expanding the tubular extrusion product by stretching in the direction of its axis. Subsequent to the expanding, the expanded extrusion product is heated to a temperature of the melting point of PTFE or higher while holding it to avoid shrinkage, so that the expanded structure is sintered and fixed. When the stretching temperature is sufficiently high, the sintering and fixing is effected concurrently with the expanding step.

Despite such various excellent properties as mentioned above, porous PTFE tubes have a strong molecular orientation in the direction of extrusion and tend to tear in the direction of their longitudinal axes. Porous PTFE tubes are, therefore, accompanied by a problem in that, when blood vessels in living bodies are shunted using porous PTFE tubes as artificial blood vessels, the tubes may tear in the direction of their longitudinal axes by suture needles or sutures to induce hematoma formation or false aneurysm due to blood leakage. This problem becomes particularly pronounced when upon production of porous PTFE tubes, the stretch ratio is increased to make the porosity higher, the pore size is made greater, or the wall thickness is reduced.

As a method for providing an expanded PTFE tube with higher axial tear strength, it may be contemplated to perform the stretching of an extrusion product in biaxial directions, that is, in the longitudinal direction and in the radial direction. With this method alone, however, it is still impossible to achieve any substantial improvement in the axial tear strength.

A process was therefore reported in JP-B-43-20384 and JP-B-7-15022. According to that process, extrusion is conducted while providing an extrusion product with an orientation at an angle with respect to the direction of a longitudinal axis by producing a helical flow in the extrusion product with a helical groove formed on a die or mandrel of a ram extruder.

In the above-described process, however, the extrusion product is stretched in the direction of its longitudinal axis in a subsequent step so that the intersecting angle between the direction of the orientation and the direction of the longitudinal axis becomes too small to expect any substantial improvement in the axial tear strength. Especially when stretching at a high stretch ratio of 4 times or more in the longitudinal direction is needed to produce a porous PTFE tube having a high porosity of 70% or more, the direction of orientation becomes closer to the direction of the longitudinal axis so that practically no effect is expected in increasing the axial tear strength.

With a view to obtaining a porous PTFE tube having high axial tear strength, it was also proposed to reduce the porosity or to reinforce a porous PTFE tube by helically winding an expanded PTFE tape on an outer surface of the porous PTFE tube (JP-B-52-9074). Nowadays, one of two methods is adopted, one being to lower the porosity of a porous PTFE tube, and the other being to helically wind an expanded PTFE tape or filament on the outer surface of a porous PTFE tube such that the porous PTFE tube is reinforced.

However, the method, which relies upon a reduction in the porosity of a porous PTFE tube or a reinforcement by a tape or filament wound on the outer surface of a porous PTFE tube, involves a problem that some inherent characteristics of a porous PTFE tube, such as flexibility and tissue cells invasion, are impaired although the method is effective in increasing the axial tear strength.

DISCLOSURE OF THE INVENTION

Objects of the present invention are to provide an expanded PTFE product, such as a porous PTFE tube, equipped with high axial tear strength even without any reinforcement owing to an improvement in the axial tear strength of the expanded PTFE product itself and also to provide a process for its production. A further object of the present invention is to provide an artificial blood vessel made of a porous PTFE tube having high porosity and high axial tear strength.

The present inventors have proceeded with extensive research to achieve the above-described objects. As a result, it has been found that in a step of extruding a mixture of unsintered powder of PTFE and a lubricant into a predetermined shape by a ram extruder, extrusion at a higher speed than the conventional speed makes it possible to obtain an expanded PTFE product pronouncedly improved in axial tear strength.

Based on the above finding, a high-speed ram extrusion technique and a ram extruder suited for the technique have been also developed. Their developments have made it possible to stably produce an expanded PTFE product, such as a porous PTFE tube, having high porosity and high axial tear strength. This porous PTFE tube is equipped with excellent properties especially as an artificial blood vessel. The present invention have been completed based on these findings.

According to the present invention, there is thus provided an expanded polytetrafluoroethylene product having a microstructure comprising fibrils and nodes interconnected with each other by the fibrils, wherein the expanded polytetrafluoroethylene product has an axial tear strength of not lower than 6,000 gf/mm as calculated in accordance with the following formula: $L/[T \times (V/100)]$ where L (gf) is an axial tear load, T (mm) is a wall thickness, and V (%) is a volume ratio of resin.

The expanded polytetrafluoroethylene product can preferably be a porous polytetrafluoroethylene tube. According to the present invention, an artificial blood vessel made of the porous polytetrafluoroethylene tube is also provided.

According to the present invention, there is also provided a process for the production of an expanded polytetrafluoroethylene product having an axial tear strength of not lower than 6,000 gf/mm as calculated in accordance with the following formula: $L/[T \times (V/100)]$ where L (gf) is an axial tear load, T (mm) is a wall thickness, and V (%) is a volume ratio of resin (volume resin ratio), said process including the following steps: 1) extruding a mixture, which comprises unsintered powder of polytetrafluoroethylene and a lubricant, into a predetermined shape by a ram extruder, 2) stretching the resulting extrusion product, and 3) sintering the thus-stretched product, wherein in the step 1, the extrusion is conducted under such conditions that an extrusion speed determined from a product of an extrusion reduction ratio and a ram speed becomes not slower than 19 m/min.

BEST MODES FOR CARRYING OUT THE INVENTION

Figure 1:
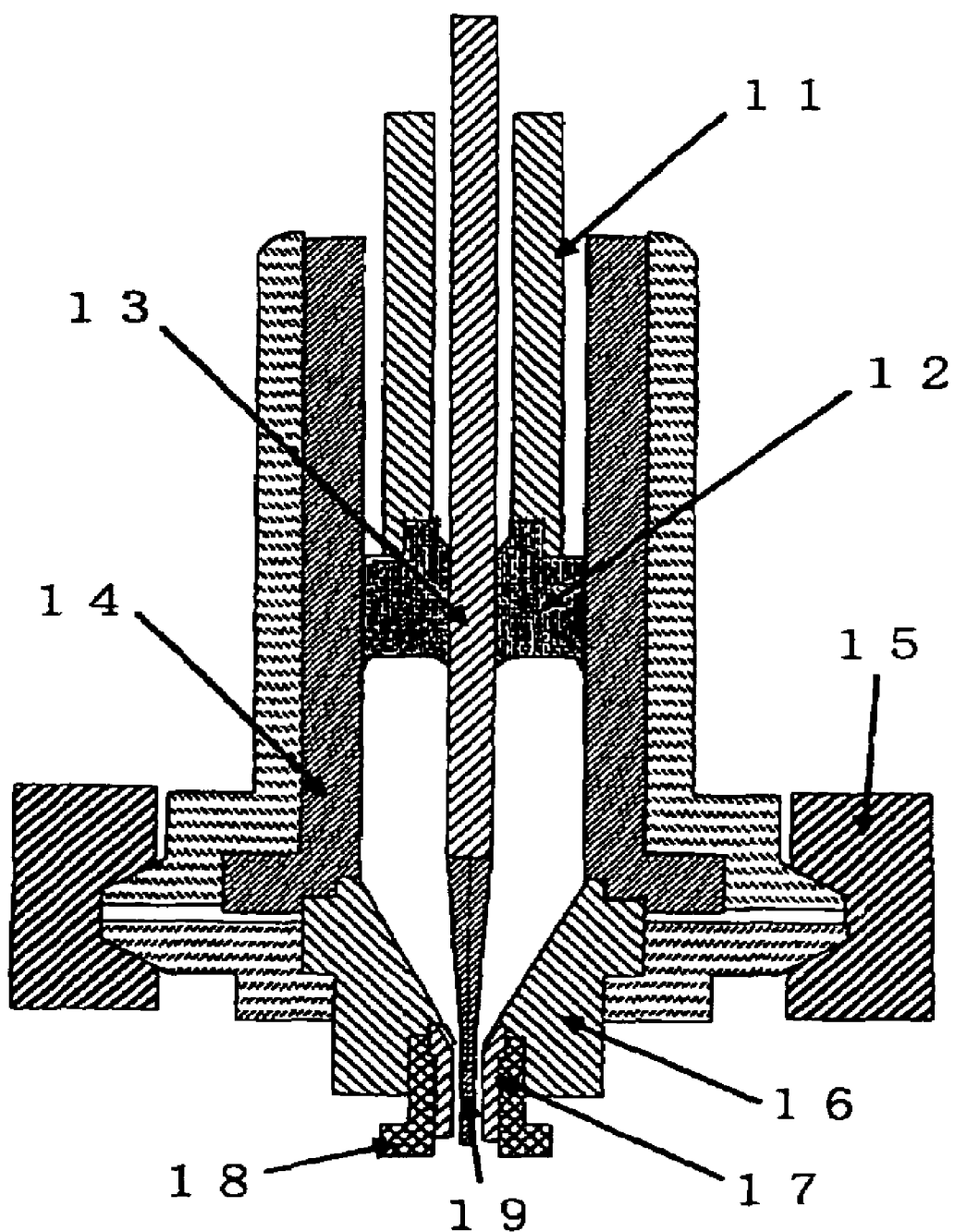
FIG. 1 is a cross-sectional view of a conventional ram extruder.

The expanded PTFE product according to the present invention can take various forms such as tubes, filaments and rods. Concerning an expanded PTFE tube (i.e., porous PTFE tube) as a representative example of such forms, its production process will be described specifically.

To produce the porous PTFE tube, a lubricant is firstly mixed with unsintered powder of PTFE to prepare a mixture, the mixture is extruded into the form of a tube by using a ram extruder, and then, the tube is stretched at a desired stretch ratio in the direction of its axis. These procedures can be conducted by following the process described in JP-B-42-13560, for example. While holding the resultant tube to avoid shrinkage, the tube is heated at its sintering temperature of 327° C. or higher to sinter and fix the stretched structure. By this process, the porous PTFE tube can be obtained.

As the lubricant which is mixed as an aid, it is preferred to use a liquid lubricant which is in a liquid form at environmental temperature, such as naphtha. The liquid lubricant may be eliminated in the stretching step, although it is generally dried off subsequent to the extrusion step.

The porosity and fibril length of the porous PTFE can be set as desired by adjusting its stretch ratio and stretch strain ratio. The stretching is generally conducted by effecting unidirectional stretching. The stretch ratio is selected generally from a range of from 1.2 to 15 times, preferably from a range of from 2 to 10 times, more preferably from a range of from 3 to 8 times. The sintering may be conducted while effecting stretching, although it may also be conducted subsequent to the stretching step. To sinter the extrusion product while stretching it, the extrusion product can be stretched, for example, in an electric furnace controlled at 350 to 800° C. Conditions for the stretching and sintering after the extrusion step can be chosen as desired from the conditions known in this technical field.

To obtain the expanded PTFE product, such as the porous PTFE tube, having high axial tear strength according to the present invention, the extrusion speed determined as the product of the extrusion reduction ratio, which may hereinafter be called "the extrusion RR", and the ram speed (mm/min) is set at not slower than 19 m/min, preferably not slower than 40 m/min in the extrusion step. It is preferred to set the extrusion RR at not smaller than 250 at this time, with not smaller than 320 being more preferred. The upper limit of the extrusion RR can be preferably 700, more preferably 650, especially preferably 600. The upper limit of the extrusion speed is 100 m/min in general, although it is 70 m/min or so in many instances.

To improve the extrusion formability at high speed, it may be considered preferable to mix the liquid lubricant in a relatively high proportion relative to the unsintered powder of PTFE. Mixing of the liquid lubricant in an excess amount, however, may lead to an expanded PTFE product of lowered strength. It is, therefore, desired to mix the liquid lubricant preferably in a proportion of not greater than 30 parts by weight, more preferably in a proportion of not greater than 26 parts by weight to 100 parts by weight of the unsintered powder of PTFE. The lower limit of the proportion of the liquid lubricant may be preferably 15 parts by weight, more preferably 18 parts by weight, especially preferably 20 parts by weight to 100 parts by weight of the unsintered powder of PTFE. It is desired to limit the amount of the liquid lubricant, which is to be added to 1 kg of the unsintered powder of PTFE, preferably to 380 mL or less, more preferably to 330 mL or less.

When ram extrusion is conducted under the above-described conditions, a disturbance tends to occur in a resin flow so that a mandrel or core pin of a ram extruder may be off-centered, thereby possibly developing a problem in quality to such an extent as the resulting extrusion product cannot be provided for actual use due to a reduction in the dimensional accuracy of the extrusion or the formation of damages in the form of axial grooves in an outer surface of the extrusion product. To overcome this problem, it is important to make the content of the liquid lubricant in a paste (billet) before the ram extrusion and its density distribution as even as possible. With only these measures, however, no sufficient effects can be recognized for the lessening of the problem.

The present inventors pursued its cause. As a result, it was found that a small step and clearance inherently exist between a flange of a barrel and that of a master die due to the structure of a ram extruder and they act as primary causes of the disturbance in the resin flow. As an effective method for the elimination of the problem, the present inventors have developed a process for producing an extrusion product by using a ram extruder in which a barrel and a master cylinder are combined as a unitary structure.

As illustrated in FIG. 1, a conventional ram extruder is constructed of an extrusion ram 11, a ram tip 12, a mandrel 13, a barrel 14, a fastening clamp 15, a master die 16, a die 17, a die-fastening bolt 18, a core pin 19, and so on. In this ram extruder, the cylinder 14, the master die 16 and the die 17 are discrete members, and their flanges are fastened by hydraulic clamps or bolts.

It has been found that, when high-speed extrusion is conducted using a conventional ram extruder such as that illustrated in FIG. 1, the resin pressure increases, a step and clearance hence become greater especially between the flange of the cylinder 14 and that of the master die 16, and as a result, the disturbance in the resin flow becomes severer as typified by the formation of stagnated parts and peeled parts in the resin flow and the development of a leakage of the resin flow. In addition, it has also been found that the groove-shaped damages formed in the surface of the extrusion product occurred along the step formed at the flanges. To suppress the disturbance in the resin flow under the high-speed ram extrusion conditions, it is accordingly necessary to structurally eliminate the step and clearance at the flanges of the barrel and master die. Based on this finding, the present inventors have contemplated the process for conducting high-speed extrusion by using a ram extruder having a barrel and a master cylinder combined together into a continuous unitary structure and suited for high-speed extrusion.

In the present invention, a ram extruder of such a structure as shown in FIG. 1 can be used. To obtain an expanded PTFE product having a small circumferential variation in thickness and more pronouncedly improved axial tear strength, however, it is preferred to use a ram extruder which, as illustrated in FIG. 2, is equipped with an extrusion jig 26 formed of a barrel and a master die combined together into a continuous unitary structure with jointless smooth continuity therebetween and having a resin-contacting wall machined into a smooth surface by grinding.

Figure 2:
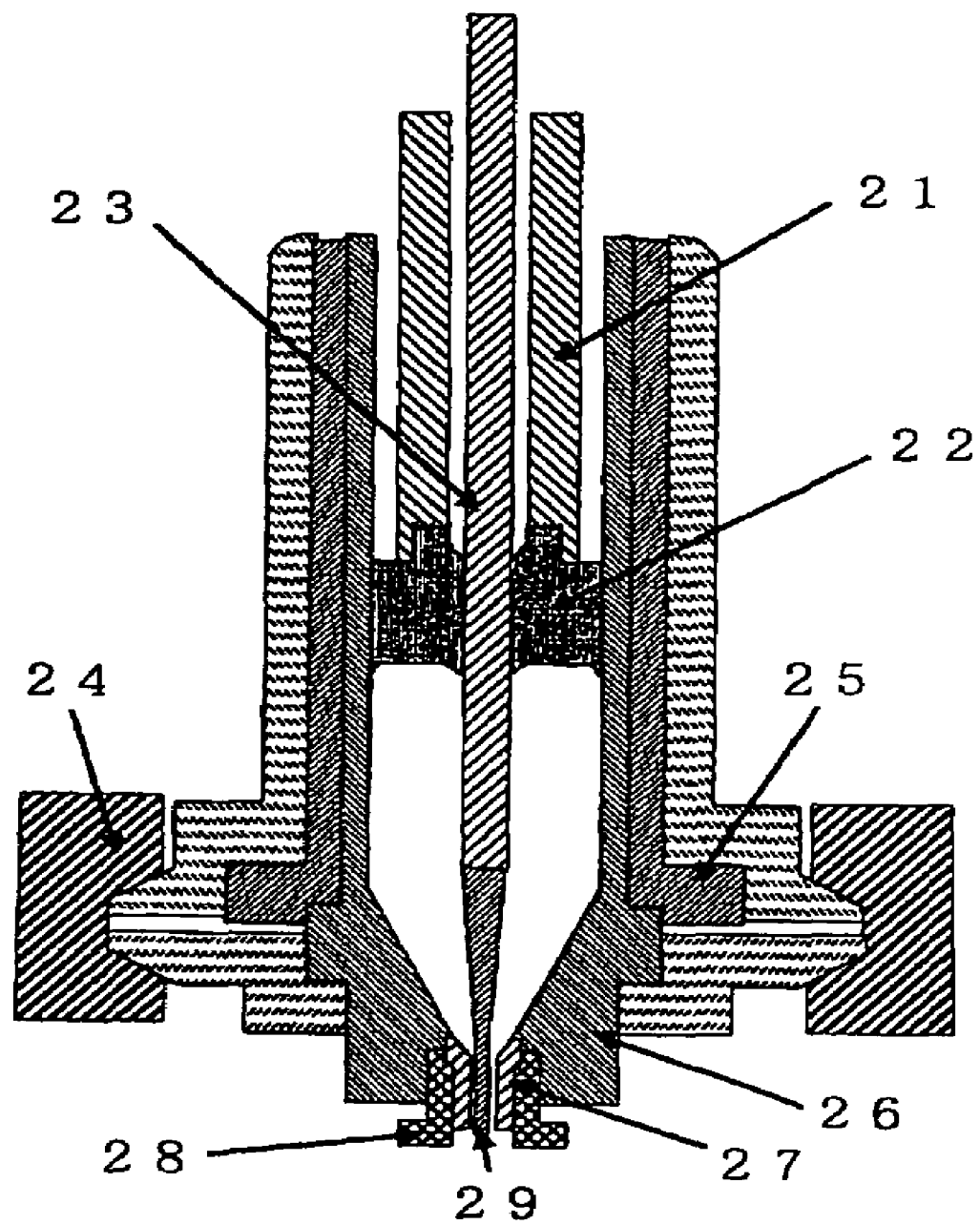
FIG. 2 is a cross-sectional view of a ram extruder in which a cylinder and a master die are in the form of a jointless, continuous, unitary structure unit.

As shown in FIG. 2, the ram extruder in which the barrel and master die are combined together into the jointless, continuous unitary structure is constructed of an extrusion ram 21, a ram tip 22, a mandrel 23, a fastening clamp 24, a barrel housing 25, the extrusion jig (continuous unitary structure unit) 26 with the barrel and master die combined together into the jointless unitary structure unit, a die 27, a die-fastening bolt 28, a core pin 29, and so on.

The continuous unitary structure unit 26 of the barrel and master die is desirably formed with a material having high strength and hardness sufficient to withstand the resin pressure and corrosion resistance, but it can be made of carbon steel or the like with hard and corrosion-resistant chrome plating applied thereon. The resin (billet) with the liquid lubricant mixed therewith is loaded through an opening of the barrel portion of the continuous unitary structure unit 26, and then, the continuous unitary structure unit 26 is mounted on a main body of the ram extruder. The main body of the ram extruder may preferably be equipped with the barrel housing 25 and a barrel lifter mechanism to facilitate the mounting/dismounting of the continuous unitary structure unit 26.

The inner diameter of the barrel may set preferably such that the extrusion RR becomes not smaller than 250, with not smaller than 320 being more preferred. The length of a linear section of the barrel can be determined by a calculation from a resin volume which is required to obtain an extrusion product of a desired length. An appropriate value of an internal angle of a tapered master die portion of the continuous unitary structure unit 26 and the die 27 can be set preferably at as great an internal angle as possible in view of a producible maximum resin pressure of the ram extruder from the standpoint of increasing the axial tear strength further, although it varies depending on the extrusion conditions.

The expanded PTFE product according to the present invention can preferably be in the form of a tube. This tube is a porous PTFE tube. When the porous PTFE tube according to the present invention is used as an artificial blood vessel material, the fibril length (average value) and porosity can be set preferably at not shorter than 20 μm and not lower than 60%, more preferably at not shorter than 40 μm and not lower than 70%, respectively, in order to enhance the tissue cells invasion such that the artificial blood vessel can be provided with equivalent functions to those of the blood vessels in the living body at an early stage subsequent to its grafting and can remain open. The upper limit of the fibril length may be preferably 100 μm, more preferably 80 μm, especially preferably 60 μm. The upper limit of the porosity may be preferably 90%, with 85% being more preferred. The wall thickness of the tube may be preferably from 200 to 1,000 μm, more preferably from 300 to 900 μm, although it varies depending on the inner diameter.

The circumferential variation in the thickness of the expanded PTFE product may be preferably not greater than 45%, more preferably not greater than 40%, still more preferably not greater than 35%. In fields where expanded PTFE products of particularly small circumferential variations in the thickness are required, it is desired to control the circumferential variation in the thickness to smaller than 15%, notably to not greater than 10%.

When extrusion is performed under such conditions as achieving an extrusion speed of not slower than 19 m/min by using the ram extruder of the "discrete structure" illustrated in FIG. 1 that the barrel and the master die are not combined into a unitary structure, the circumferential variation in the thickness of the finally-available expanded PTFE product generally falls within a range of from 15 to 45% or so, and therefore, becomes relatively large.

When extrusion is performed under such conditions as achieving an extrusion speed of not slower than 19 m/min by using a ram extruder equipped with a barrel and a master die combined together into a continuous unitary structure with jointless smooth continuity therebetween as illustrated in FIG. 2, on the other hand, the circumferential variation in the thickness of the finally-available expanded PTFE product can be controlled to fall preferably within a range of 3% or greater but smaller than 15%, more preferably within a range of from 4 to 13%, especially preferably within a range of from 5 to 10%.

The axial tear strength of the stretch PTFE product can be calculated in accordance with the following formula: $L/[T\times(V/100)]$ where L (gf) is an axial tear load, T (mm) is a wall thickness, and V (%) is a volume ratio of resin. The axial tear strength is not lower than 6,000 gf/mm, preferably not lower than 6,500 gf/mm, more preferably not lower than 7,000 gf/mm. The upper limit of the axial tear strength is generally 12,000 gf/mm, but in many instances, is 10,000 gf/mm or so.

In addition to a tube, the expanded PTFE product according to the present invention can also take the form of a filament, rod or the like. Further, the expanded PTFE product can also take the form of an elongated, expanded PTFE tape. As the expanded PTFE product according to the present invention is equipped with axial tear strength pronouncedly improved compared with conventional products, it is preferred to obtain the expanded PTFE product in the form of a tube and to use it as an artificial blood vessel material of a desired diameter.

EXAMPLES

The present invention will hereinafter be described more specifically based on examples and comparative examples. The following methods were employed for the measurement, ranking and calculation of physical properties and other characteristic properties.

(1) Extrusion Reduction Ratio (Extrusion RR)

An extrusion reduction ratio was calculated in accordance with the following formula:

$$\text{Extrusion RR} = (D_1^2 - D_2^2) \div (d_1^2 - d_2^2)$$

where
- $D_1$: extruder barrel diameter,
- $D_2$: extruder mandrel diameter,
- $d_1$: extruder die diameter, and
- $d_2$: extruder core pin diameter.

(2) Extrusion Speed

An extrusion speed was calculated in accordance with the following formula:

$$\text{Extrusion speed(m/min)} = (\text{extrusion RR}) \times [\text{ram speed (mm/min)}]$$

(3) Wall Thickness and Circumferential Variation in thickness

An expanded PTFE tube was embedded in a paraffin block which had been colored black with a dye. Subsequently, the paraffin block was shaved with a microtome to have one cross-section of the expanded PTFE tube exposed in an outer surface of the paraffin block so that a sample was prepared for the observation of a wall thickness. Under a stereomicroscope, the wall thickness of that sample was measured at four points (n=4) along the circumference thereof, and an average of the values so measured was recorded as its wall thickness. From those four measurement values, a circumferential variation in thickness was determined in accordance with the following formula:

$$\text{Circumferential variation in thickness (\%)} = [(\text{largest thickness} - \text{smallest thickness}) \div \text{wall thickness}] \times 100$$

(4) Porosity

A porosity was determined in accordance with ASTM D-792. Upon calculation of the porosity, 2.25 g/cc was used as the true specific gravity of PTFE.

(5) Volume Ratio of Resin

A volume ratio of resin was calculated in accordance with the following formula:

$$\text{Volume ratio of resin} = 100 - \text{porosity (\%)}$$

(6) Fibril Length

Under a scanning electron microscope (SEM), an inner wall of an expanded PTFE tube was observed. Selected were thirty or more fibrils, which existed in an area of a rectangular visual field of 300 μm or greater in width along the radial direction and 400 μm or greater in length along the axial direction, and their lengths were measured. Extracting the top 10% of all the fibrils from the one having the longest measured value, their average value was recorded as a fibril length.

(7) Axial Tear Load (gf)

An expanded PTFE tube was cut crosswise along a plane which is perpendicular to the axis of the tube. At a position 3 mm apart from an edge of a cut end of the tube in the direction of the axis of the tube, a round needle of 0.4 mm in outer diameter was pierced at right angles through the wall of the tube to form through-holes. The tube was next fixed at an opposite end thereof, where no through-holes had been formed, on a grip attached to a load cell of a uniaxial tensile testing machine ("Autograph AG500E", manufactured by Shimadzu Corporation). A mild steel wire of 0.2 mm in outer diameter was caused to extend through the through-holes, and was then fixed at opposite ends thereof on another grip fixedly secured on a crosshead. At a crosshead speed of 20 mm/min, the wire was pulled in the axial direction of the tube. Here, the crosshead was caused to undergo continuous displacements until the tube was completely torn up and the wire separated from the tube. A maximum load at this time was recorded as an axial tear load (gf).

(8) Axial Tear Strength (gf/mm)

An axial tear strength can be calculated in accordance with the following formula: $L/[T \times (V/100)]$ where L (gf) is an axial tear load, T (mm) is a wall thickness, and V (%) is a volume ratio of resin. More specifically, the axial tear strength was calculated in accordance with below-described formula. Calculated was an average value of five samples measured (n=5).

$$\text{Axial tear strength (gf/mm)} = [\text{axial tear load (gf)}] \div [\text{wall thickness (mm)}] \div [\text{volume ratio of resin} \div 100]$$

Example 1

Naphtha ("DRYSOL", product of Esso SS; 26 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 4.8 mm die diameter, 3 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 75% porosity and 53 μm fibril length.

Example 2

Naphtha ("DRYSOL", product of Esso SS; 23 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 6.3 mm die diameter, 4.5 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 74% porosity and 45 μm fibril length.

Example 3

Naphtha ("DRYSOL", product of Esso SS; 22 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 7.26 mm die diameter, 5.35 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 74% porosity and 43 µm fibril length.

Example 4

Naphtha ("DRYSOL", product of Esso SS; 23 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 6.3 mm die diameter, 4.5 mm core pin diameter, and 150 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 75% porosity and 52 µm fibril length.

Example 5

Naphtha ("DRYSOL", product of Esso SS; 22 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 7.26 mm die diameter, 5.35 mm core pin diameter, and 150 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 72% porosity and 48 µm fibril length.

Example 6

Naphtha ("DRYSOL", product of Esso SS; 25.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 130 mm barrel diameter, 50 mm mandrel diameter, 8.6 mm die diameter, 6.4 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 79% porosity and 40 µm fibril length.

Example 7

Naphtha ("DRYSOL", product of Esso SS; 25.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were combined together in a continuous unitary form, the mixture was then extruded into the form of a tube under the following conditions: 130 mm barrel diameter, 50 mm mandrel diameter, 8.6 mm die diameter, 6.4 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 79% porosity and 43 µm fibril length.

Example 8

Naphtha ("DRYSOL", product of Esso SS; 25.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were combined together in a continuous unitary form, the mixture was then extruded into the form of a tube under the following conditions: 130 mm barrel diameter, 50 mm mandrel diameter, 8.6 mm die diameter, 6.4 mm core pin diameter, and 150 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 81% porosity and 58 µm fibril length.

Example 9

Naphtha ("DRYSOL", product of Esso SS; 25.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were combined together in a continuous unitary form, the mixture was then extruded into the form of a tube under the following conditions: 130 mm barrel diameter, 21 mm mandrel diameter, 11.0 mm die diameter, 8.6 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 80% porosity and 48 µm fibril length.

Example 10

Naphtha ("DRYSOL", product of Esso SS; 25.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were combined together in a continuous unitary form, the mixture was then extruded into the form of a tube under the following conditions: 130 mm barrel diameter, 21 mm mandrel diameter, 11.0 mm die diameter, 8.6 mm core pin diameter, and 150 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 81% porosity and 55 µm fibril length.

Comparative Example 1

Naphtha ("DRYSOL", product of Esso SS; 26 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 4.8 mm die diameter, 3 mm core pin diameter, and 30 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 73% porosity and 51 µm fibril length.

Comparative Example 2

Naphtha ("DRYSOL", product of Esso SS; 23 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 6.3 mm die diameter, 4.5 mm core pin diameter, and 30 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 73% porosity and 48 µm fibril length.

Comparative Example 3

Naphtha ("DRYSOL", product of Esso SS; 22 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 7.26 mm die diameter, 5.35 mm core pin diameter, and 30 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 4.5 times to obtain a porous PTFE tube having 74% porosity and 43 µm fibril length.

Comparative Example 4

Naphtha ("DRYSOL", product of Esso SS; 21.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 8.6 mm die diameter, 6.4 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 80% porosity and 35 µm fibril length.

Comparative Example 5

Naphtha ("DRYSOL", product of Esso SS; 18.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 11.0 mm die diameter, 8.6 mm core pin diameter, and 60 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 79% porosity and 20 µm fibril length.

Comparative Example 6

Naphtha ("DRYSOL", product of Esso SS; 18.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 11.0 mm die diameter, 8.6 mm core pin diameter, and 6 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 77% porosity and 18 µm fibril length.

Comparative Example 7

Naphtha ("DRYSOL", product of Esso SS; 18.5 parts by weight) was mixed with PTFE fine powder ("POLYFLON F104", product of Daikin Industries, Ltd.), and the resulting mixture was left over for 2 hours in a constant-temperature chamber controlled at 30° C. Using a ram extruder of the type that a barrel and a master die were discrete from each other, the mixture was then extruded into the form of a tube under the following conditions: 90 mm barrel diameter, 21 mm mandrel diameter, 11.0 mm die diameter, 8.6 mm core pin diameter, and 100 mm/min ram speed. Subsequently, naphtha was dried off from the tube over 48 hours in a constant-temperature chamber controlled at 60° C. The tube was sintered in an electric furnace controlled at 600° C. while stretching it at a stretch ratio of 6 times to obtain a porous PTFE tube having 80% porosity and 22 µm fibril length.

Comparative Examples 8-17

Commercially-available, ten (10) artificial blood vessels were measured for properties consisting of porosity, fibril length, wall thickness and axial tear strength. The artificial blood vessels of W.L. Gore & Associates' Medical Product Division, Baxter Healthcare Corporation and Meadox Medicals Inc. were reinforced by tape-shaped or filament-shaped PTFE wound on outer surfaces of expanded PTFE tubes, respectively. It was possible to remove those reinforcements without damaging the expanded PTFE tubes which were main bodies of the artificial blood vessels. Concerning the artificial blood vessels of W.L Gore & Associates' Medical Product Division, Baxter Healthcare Corporation and Meadox Medicals Inc., the properties of their expanded PTFE tubes without the reinforcements were ranked.

TABLE 1

| | | Example 1 | Example 2 | Example 3 | Example 4 | Example 5 |
|---|---|---|---|---|---|---|
| Production conditions | Proportion of extrusion aid (parts by weight) | 26 | 23 | 22 | 23 | 22 |
| | Structure of ram extruder | Discrete barrel and master die | Discrete barrel and master die | Discrete barrel and master die | Discrete barrel and master die | Discrete barrel and master die |
| | Barrel diameter (mm) | 90 | 90 | 90 | 90 | 90 |
| | Mandrel diameter (mm) | 21 | 21 | 21 | 21 | 21 |
| | Die diameter (mm) | 4.8 | 6.3 | 7.26 | 6.3 | 7.26 |
| | Core pin diameter (mm) | 3 | 4.5 | 5.35 | 4.5 | 5.35 |
| | Extrusion RR | 546 | 394 | 318 | 394 | 318 |
| | Ram speed (mm/min) | 60 | 60 | 60 | 150 | 150 |
| | Extrusion speed (m/min) | 33 | 24 | 19 | 59 | 48 |
| | Stretch ratio | 4.5 | 4.5 | 4.5 | 4.5 | 4.5 |
| Ranking results of properties | Circumferential variation in thickness | 24 | 18 | 22 | 28 | 26 |
| | Fibril length (μm) | 53 | 45 | 43 | 52 | 48 |
| | Porosity (%) | 75 | 74 | 74 | 75 | 72 |
| | Volume ratio of resin | 25 | 26 | 26 | 25 | 28 |
| | Average wall thickness (μm) | 672 | 683 | 715 | 675 | 737 |
| | Axial tear load (gf) | 1148 | 1078 | 1123 | 1216 | 1355 |
| | Axial tear strength (gf/mm) | 6833 | 6071 | 6041 | 7206 | 6566 |

| | | Example 6 | Example 7 | Example 8 | Example 9 | Example 10 |
|---|---|---|---|---|---|---|
| Production conditions | Proportion of extrusion aid (parts by weight) | 25.5 | 25.5 | 25.5 | 25.5 | 25.5 |
| | Structure of ram extruder | Discrete barrel and master die | Continuous unitary barrel and master die | Continuous unitary barrel and master die | Continuous unitary barrel and master die | Continuous unitary barrel and master die |
| | Barrel diameter (mm) | 130 | 130 | 130 | 130 | 130 |
| | Mandrel diameter (mm) | 50 | 50 | 50 | 21 | 21 |
| | Die diameter (mm) | 8.6 | 8.6 | 8.6 | 11 | 11 |
| | Core pin diameter (mm) | 6.4 | 6.4 | 6.4 | 8.6 | 8.6 |
| | Extrusion RR | 436 | 436 | 436 | 350 | 350 |
| | Ram speed (mm/min) | 60 | 60 | 150 | 60 | 150 |
| | Extrusion speed (m/min) | 26 | 26 | 65 | 21 | 53 |
| | Stretch ratio | 6 | 6 | 6 | 6 | 6 |
| Ranking results of properties | Circumferential variation in thickness | 35 | 6 | 6 | 7 | 8 |
| | Fibril length (μm) | 40 | 43 | 58 | 48 | 55 |
| | Porosity (%) | 79 | 79 | 81 | 80 | 81 |
| | Volume ratio of resin | 21 | 21 | 19 | 20 | 19 |
| | Average wall thickness (μm) | 785 | 775 | 778 | 846 | 851 |
| | Axial tear load (gf) | 1087 | 1250 | 1444 | 1158 | 1432 |
| | Axial tear strength (gf/mm) | 6594 | 7680 | 9769 | 6844 | 8856 |

TABLE 2

| | | Comp. Ex. 1 | Comp. Ex. 2 | Comp. Ex. 3 | Comp. Ex. 4 |
|---|---|---|---|---|---|
| Production conditions | Proportion of extrusion aid (parts by weight) | 26 | 23 | 22 | 21.5 |
| | Structure of ram extruder | Discrete barrel and master die | Discrete barrel and master die | Discrete barrel and master die | Discrete barrel and master die |

TABLE 2-continued

|  |  |  |  |  |  |
|---|---|---|---|---|---|
|  | Barrel diameter (mm) | 90 | 90 | 90 | 90 |
|  | Mandrel diameter (mm) | 21 | 21 | 21 | 21 |
|  | Die diameter (mm) | 4.8 | 6.3 | 7.26 | 8.6 |
|  | Core pin diameter (mm) | 3 | 4.5 | 5.35 | 6.4 |
|  | Extrusion RR | 546 | 394 | 318 | 232 |
|  | Ram speed (mm/min) | 30 | 30 | 30 | 60 |
|  | Extrusion speed (m/min) | 16 | 12 | 10 | 14 |
|  | Stretch ratio | 4.5 | 4.5 | 4.5 | 6 |
| Ranking results of properties | Circumferential variation in thickness | 15 | 7 | 4 | 6 |
|  | Fibril length (μm) | 51 | 48 | 43 | 35 |
|  | Porosity (%) | 73 | 73 | 74 | 80 |
|  | Volume ratio of resin | 27 | 27 | 26 | 20 |
|  | Average wall thickness (μm) | 672 | 678 | 730 | 783 |
|  | Axial tear load (gf) | 953 | 697 | 635 | 350 |
|  | Axial tear strength (gf/mm) | 5252 | 3807 | 3346 | 2235 |

|  |  | Comp. Ex. 5 | Comp. Ex. 6 | Comp. Ex. 7 |
|---|---|---|---|---|
| Production conditions | Proportion of extrusion aid (parts by weight) | 18.5 | 18.5 | 18.5 |
|  | Structure of ram extruder | Discrete barrel and master die | Discrete barrel and master die | Discrete barrel and master die |
|  | Barrel diameter (mm) | 90 | 90 | 90 |
|  | Mandrel diameter (mm) | 21 | 21 | 21 |
|  | Die diameter (mm) | 11 | 11 | 11 |
|  | Core pin diameter (mm) | 8.6 | 8.6 | 8.6 |
|  | Extrusion RR | 163 | 163 | 163 |
|  | Ram speed (mm/min) | 60 | 6 | 100 |
|  | Extrusion speed (m/min) | 10 | 1 | 16 |
|  | Stretch ratio | 6 | 6 | 6 |
| Ranking results of properties | Circumferential variation in thickness | 7 | 8 | 10 |
|  | Fibril length (μm) | 20 | 18 | 22 |
|  | Porosity (%) | 79 | 77 | 80 |
|  | Volume ratio of resin | 21 | 23 | 20 |
|  | Average wall thickness (μm) | 854 | 848 | 852 |
|  | Axial tear load (gf) | 450 | 375 | 678 |
|  | Axial tear strength (gf/mm) | 2509 | 1923 | 3979 |

TABLE 3

|  |  | Comp. Ex. 8 | Comp. Ex. 9 | Comp. Ex. 10 | Comp. Ex. 11 | Comp. Ex. 12 |
|---|---|---|---|---|---|---|
| Maker |  | Gore | Gore | Impra | Impra | Atrium |
| Manner of reinforcement for artificial blood vessel |  | Reinforcement by tape winding | Reinforcement by tape winding | Low porosity | Low porosity | Low porosity |
| Axial tear load of artificial blood vessel (gf) |  | 921 | 891 | 873 | 764 | 533 |
| Properties of expanded PTFE tube | Fibril length (μm) | Not measured | 24 | Not measured | 21 | Not measured |
|  | Porosity (%) | 74 | 73 | 66 | 70 | 59 |
|  | Volume ratio of resin | 26 | 27 | 34 | 30 | 41 |
|  | Average wall thickness (μm) | 413 | 639 | 445 | 598 | 515 |
|  | Axial tear load (gf) | 342 | 526 | 783 | 764 | 533 |
|  | Axial tear strength (gf/mm) | 3185 | 3049 | 5175 | 4259 | 2524 |

|  |  | Comp. Ex. 13 | Comp. Ex. 14 | Comp. Ex. 15 | Comp. Ex. 16 | Comp. Ex. 17 |
|---|---|---|---|---|---|---|
| Maker |  | Atrium | Meadox | Meadox | Baxter | Baxter |
| Manner of reinforcement for artificial blood vessel |  | Low porosity | Low porosity, reinforcement by filament winding | Low porosity, reinforcement by filament winding | Reinforcement by tape winding | Reinforcement by tape winding |
| Axial tear load of artificial blood vessel (gf) |  | 664 | 803 | Not measured | 1086 | Not measured |
| Properties of expanded | Fibril length (μm) | 30 | Not | 29 | Not | 22 |

TABLE 3-continued

| PTFE tube | | measured | | measured | |
|---|---|---|---|---|---|
| Porosity (%) | 62 | 63 | 64 | 70 | 72 |
| Volume ratio of resin | 38 | 37 | 36 | 30 | 28 |
| Average wall thickness (μm) | 638 | 442 | 648 | 419 | 632 |
| Axial tear load (gf) | 664 | 598 | 1231 | 414 | 684 |
| Axial tear strength (gf/mm) | 2738 | 3657 | 5276 | 3294 | 3865 |

In each of Examples 1-10 where the extrusion speed was not slower than 19 m/min as a production condition, the axial tear strength was higher than 6,000 gf/mm. It is, therefore, understood that the porous PTFE tubes of these examples were substantially improved in axial tear strength over those of the comparative examples. When the conventional ram extruder of the discrete barrel/master die type was used (Examples 1-6), the setting of the extrusion speed at not slower than 19 m/min resulted in a high circumferential variation in thickness of not lower than 18%. When the ram extruder of the continuous unitary cylinder/die type was used (Examples 7-10), however, the circumferential variation in the thickness was significantly reduced. The setting of the extrusion speed at not slower than 19 m/min as a production condition can, therefore, produce a porous PTFE tube having high porosity, long fibril length and high axial tear strength and suited as an artificial blood vessel.

INDUSTRIAL APPLICABILITY

According to the present invention, expanded PTFE products, such as porous PTFE tubes, pronouncedly improved in their own axial tear strength are provided. Porous PTFE tubes according to the present invention have high axial tear strength even without any reinforcement, and show excellent properties especially as artificial blood vessel materials. According to the present invention, porous PTFE tubes having high porosity and high axial tear strength can be provided.

The invention claimed is:

1. A process for the production of an expanded polytetrafluoroethylene artificial blood vessel product including the following steps:
   1) extruding a mixture, which comprises unsintered fine powder of polytetrafluoroethylene and a lubricant, into a predetermined shape by a ram extruder;
   2) stretching the resulting extrusion product; and
   3) sintering the thus-stretched product, wherein
   in said step 1, said extrusion is conducted using the ram extruder comprising an extrusion ram, a mandrel, a ram tip, a core pin attached to the mandrel, a barrel, a master die and a die orifice attached to the master die,
   wherein the extrusion ram, the ram tip, the mandrel, and the core pin are coaxially located within a space formed by the barrel, the master die and the die orifice,
   wherein the barrel and master die are combined together into a jointless, continuous unitary structure, and
   wherein the ram extruder is constructed to facilitate the mounting and dismounting of the jointless, continuous unitary structure on a main body of the ram extruder,
   in said step 1, the mixture which is preformed into a billet is loaded into the barrel portion of the jointless, continuous unitary structure through an opening thereof, and then, the jointless, continuous unitary structure is mounted on the main body of the ram extruder,
   in said step 1, said extrusion is a high speed extrusion and is conducted under such conditions that an extrusion speed determined from formula (a) becomes in a range of 19 m/min to 100 m/min, and said extrusion reduction ratio is set in a range of 250 to 700:

extrusion speed(m/min)=[extrusion reduction ratio (dimensionless)×ram speed (mm/min)]/1,000    (formula (a)), in said step 2, said stretching is conducted by unidirectional stretching the resulting extrusion product at a stretch ratio of 4.5 to 15 times, and
   in said step 3, said sintering is conducted while stretching or subsequent to the stretching step, wherein the expanded polytetrafluoroethylene artificial blood vessel product has:
   i) an axial tear strength of not lower than 6,000 gf/mm as calculated in accordance with the following formula: L/[T×(V/100)] where L (gf) is an axial tear load, T (mm) is a wall thickness, and V (%) is a volume ratio of resin;
   ii) a fibril length of not shorter than 40 μm;
   iii) a porosity of not lower than 70% is obtained; and
   iv) a circumferential variation in thickness of not greater than 10% is obtained.

2. A process according to claim 1, wherein in said step 1, a mixture comprising not more than 30 parts by weight of said lubricant per 100 parts by weight of said unsintered fine powder of polytetrafluoroethylene is used.

3. A process according to claim 1, wherein an expanded polytetrafluoroethylene product having a wall thickness in a range of from 200 to 1,000 μm is obtained.

4. A process according to claim 1, wherein an expanded polytetrafluoroethylene product in a form of a tube is obtained.

* * * * *